United States Patent [19]

Pederson, Jr.

[11] 4,202,909

[45] May 13, 1980

[54] TREATMENT OF WHEY

[75] Inventor: Harold T. Pederson, Jr., Livermore, Calif.

[73] Assignee: Patent Technology, Inc., San Francisco, Calif.

[21] Appl. No.: 907,669

[22] Filed: May 19, 1978

Related U.S. Application Data

[63] Continuation-in-part of Ser. No. 744,082, Nov. 22, 1976, abandoned.

[51] Int. Cl.² ............................................. A23C 21/00
[52] U.S. Cl. ................................. 426/239; 426/583; 426/491
[58] Field of Search ..................... 426/583, 491, 239

[56] References Cited

U.S. PATENT DOCUMENTS

| | | | |
|---|---|---|---|
| 2,437,080 | 3/1948 | Daniel | 426/491 |
| 2,439,612 | 4/1948 | Peebles et al. | 27/31 |
| 3,615,664 | 10/1971 | Francis | 426/239 |
| 3,707,770 | 1/1973 | Timmins et al. | 426/491 |

FOREIGN PATENT DOCUMENTS 966361 4/1975 Canada .

OTHER PUBLICATIONS

Webb, et al., By-products from Milk, 2nd, ed., The Av. Publ. Co., Inc., Westport, Conn., 1970 (pp. 358-375).

*Primary Examiner*—David M. Naff
*Attorney, Agent, or Firm*—Flehr, Hohbach, Test, Albritton & Herbert

[57] ABSTRACT

A high yield of relatively pure lactose and salt products are produced from a permeate resulting from ultrafiltration of whey by precipitating calcium and citrate salts from the permeate without substantial precipitation of phosphate salts by concentrating the permeate to a solids content of about 40 to 45% and holding at about 180° to 200° F. for 30 to 90 minutes, removing precipitated solids from the permeate and then further concentrating the permeate and crystallizing and removing lactose.

6 Claims, 3 Drawing Figures

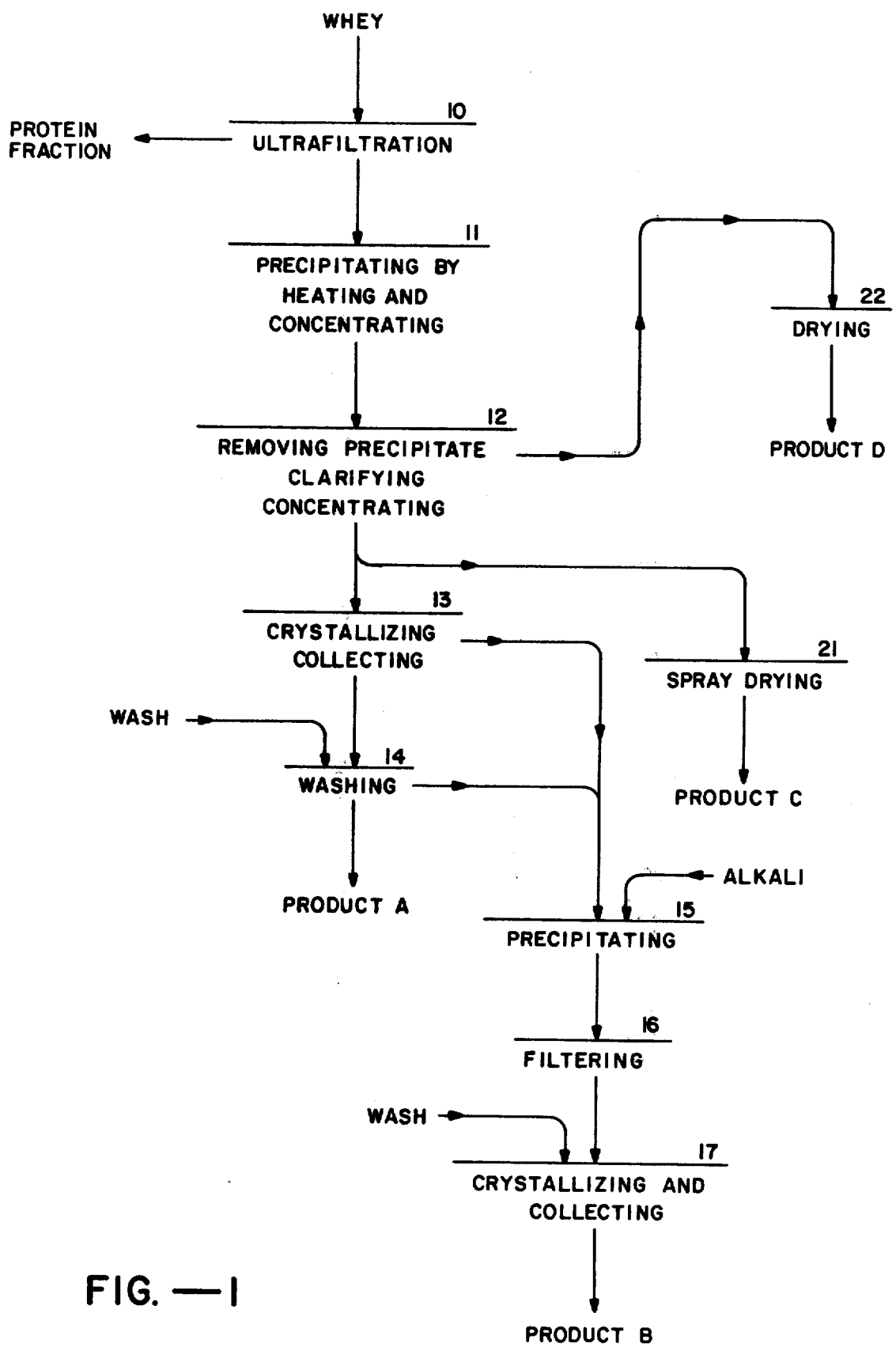
FIG.—1

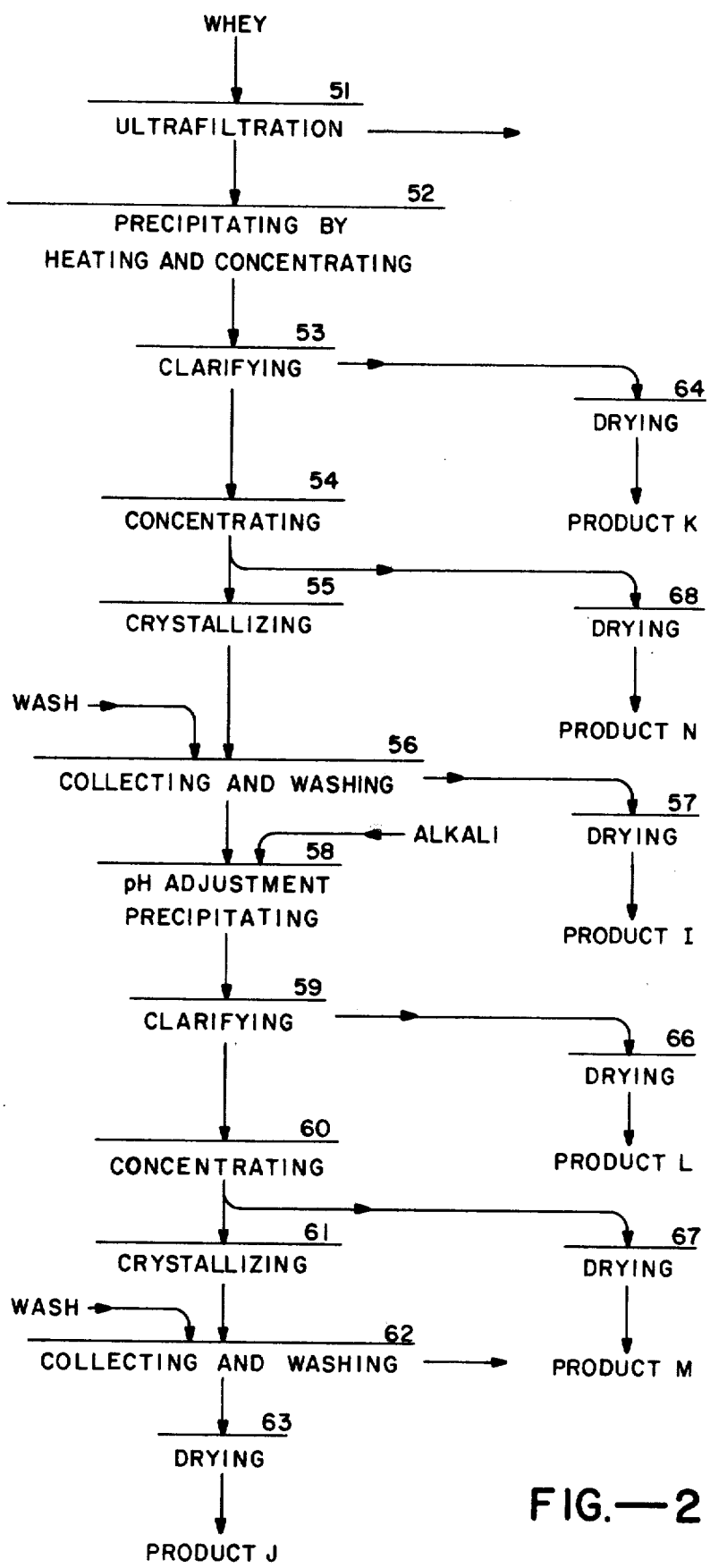
FIG.—2

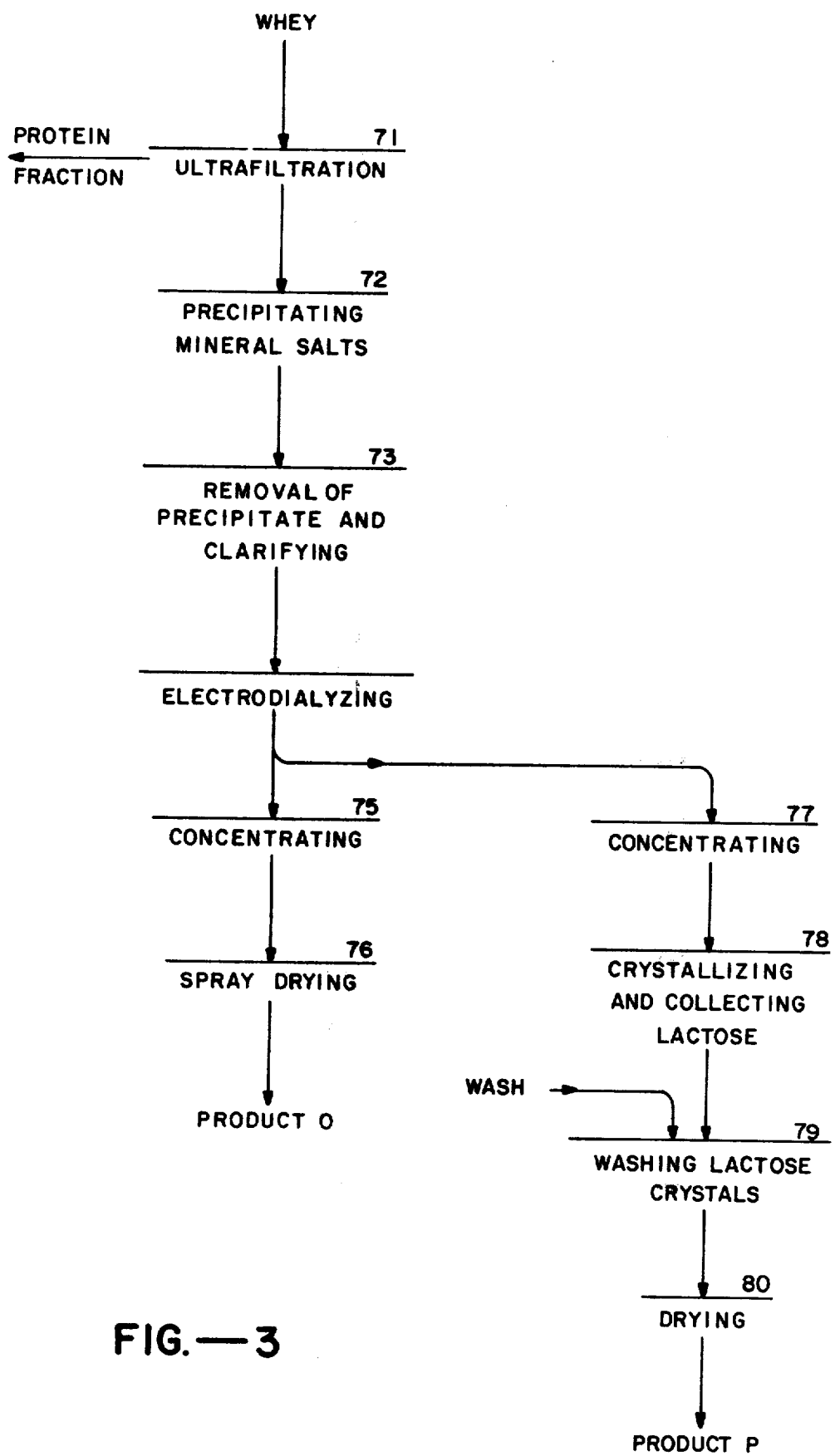
FIG.—3

TREATMENT OF WHEY

REFERENCE TO COPENDING APPLICATION

This application is a continuation-in-part of my copending application Ser. No. 744,082 filed Nov. 22, 1976 now abandoned.

BACKGROUND OF THE INVENTION

Processes are presently in commercial use which treat whey for the separation and production of various useful products, including whey protein products and lactose. One such process makes use of membrane ultrafiltration which serves to separate the whey into two fractions, one being a protein-rich fraction, and the other being a permeate rich in lactose. Such a process is disclosed in Canadian Pat. No. 966,361 dated Apr. 22, 1975. The composition of a typical whey permeate obtained by application of membrane ultrafiltration depends upon a number of factors, including the character and source of the whey, and the manner in which the membrane ultrafiltration is carried out. The principal constituents include lactose, mineral salts, protein, nonprotein nitrogen (NPN), and a small amount of fat. The mineral salts include both the natural buffer salts of milk, and also mineral salts resulting from the cheese making process from which the whey is derived. A general composition range (dry solids basis) for permeate derived from acid and sweet wheys is as follows:

| | |
|---|---|
| Lactose | 68.0 to 87.0% |
| Protein | 3.0 to 5.5% |
| NPN | 0.4 to 0.8% |
| Fat | 0.1 to 0.2% |
| Ash | 8.5 to 14.0% |
| Titratable acidity | 2.0 to 14.0% |

The term acid whey is used in the dairy industry to designate whey produced in the manufacture of cottage cheese. The term sweet whey refers to whey produced in the manufacture of other cheeses, such as Cheddar and mozzarella. Both acid and sweet wheys have a natural acidity as shown by the above general composition.

The high level of mineral salts tends to impart undesirable flavor characteristics. When processed for the removal of lactose by crystallization, which involves concentration of the permeate, certain of the salts precipitate out, together with crystallization of the lactose, and this tends to reduce the lactose yield and decrease its purity. While the permeates include substances of value, their disposal without processing poses a serious problem since it is an ecological pollutant.

Commercial processes for the manufacture of lactose generally remove lactose from whey concentrate by crystallization (see U.S. Pat. No. 2,439,612 dated Apr. 13, 1948). Such lactose is relatively impure, since it contains some whey protein and mineral salts. Resolution and recrystallization is employed to obtain products of higher purity. The remaining mother liquor is not suitable for human consumption and cannot be discarded to waste because of adverse ecological effects.

SUMMARY OF THE INVENTION AND OBJECTS

This invention relates generally to the treatment of cheese whey to produce various usable products, and more particularly to processes making use of membrane ultrafiltration and to the treatment of the resulting whey permeate.

An object of the invention is to provide a process capable of converting whey permeate into one or more products of marketable value without undue expense.

Another object is to provide a process for the treatment of whey permeate which will produce a high yield of relatively pure lactose.

Another object is to provide a process which yields one or more mineral salt products of marketable value.

Another object is to provide a permeate treatment process which facilitates elimination of disposable materials which are objectionable as ecological pollutants.

In general, the present process involves production of a whey permeate by membrane ultrafiltration of whey. As indicated above, such permeate may have a lactose content of from 68 to 87% (dry solids basis), and 3.0 to 5.5% whey protein. The permeate is concentrated and subjected to treatment in which the precipitated material is removed. The remaining material is further concentrated and subjected to further treatment to remove lactose and possibly other marketable products.

Additional objects and features of the invention will appear from the following description in which the preferred embodiments have been set forth in detail in conjunction with the accompanying drawing.

BRIEF DESCRIPTION OF THE DRAWING

FIG. 1 is a flow diagram illustrating one embodiment of the process.

FIG. 2 is a flow diagram illustrating another embodiment in which lactose is purified in two stages.

FIG. 3 is a flow diagram illustrating another embodiment.

DESCRIPTION OF THE PREFERRED EMBODIMENTS

In FIG. 1 it is assumed that the whey being treated is an edible grade acid cheese whey, although the process is deemed applicable to other types of wheys having a natural titratable acidity, such as Cheddar or mozzarella cheese whey. Preliminary to its processing, the whey may be treated in any one of various ways to control bacterial contamination, as for example, by pasteurization or chemical treatment. The whey is subjected to membrane ultrafiltration in step 10, thereby producing a protein-rich fraction and a whey permeate. Ultrafiltration may be carried out in a single stage, or in more than one stage, depending upon the protein level desired for the protein fraction. In any event, it is desirable that ultrafiltration be carried out in such a manner that the residual protein in the permeate does not amount to more than about 6.0% of the total solids content. The permeate is shown being subjected to a precipitating step 11 which serves to selectively precipitate certain of the mineral salts. More specifically, in this instance precipitation is carried out by heating the permeate, which as it is obtained from step 10 has a solids content of the order of 5.0 to 7.5%, to a temperature level of the order of from 180° to 200° F., and concentrating the permeate by vacuum evaporation to a solids content of about 40 to 45%. The sequence of these steps can be altered by first concentrating the permeate by vacuum evaporation and then heating and holding for promoting precipitation. For example, the material may be held at the indicated temperature level and concentration for a period of 30 to 90 minutes. As a result of this treatment, certain of the mineral salts are selectively precipitated, namely, the natural buffer salts of the whey. More particularly, the calcium and citrate salts of the buffering system are precipitated, whereas the phosphate salts of the buffering system do not tend to be precipitated by this treatment. Likewise, this treatment does not precipitate the simpler monovalent salts such as sodium chloride.

By application of the treatment described above, from about 5.0 to 15.0% of the total mineral salts of the permeate are precipitated. The precipitate is removed in step 12 and the remaining permeate is clarified and treated for the removal of lactose. Clarification in step 12 may be carried out while the permeate is at an elevated temperature of 180° to 200° F. The filter medium may be iron free or reduced diatomaceous earth (e.g., acid washed Celite), which serves to remove precipitate and to clarify the material. In step 13 the lactose is crystallized from the mother liquor, collected, and subsequently subjected to washing in step 14. The crystallizing step 13 is carried out with the permeate at a sufficient concentration for effective crystallization, as for example, a concentration of the order of 50 to 60% total solids. Concentration to levels which cause further precipitation of mineral salts should be avoided. Thus as indicated in step 12, it is desirable to effect some further concentration of the permeate following the filtering step, without further precipitation of salts, in order to provide an effective yield of lactose from the crystallizing operation. The lactose crystals from washing step 14 may be subjected to drying by conventional methods to produce the lactose product A.

Water of proper purity may be used for washing in step 14, although we prefer to use acidified water. For example, the wash water may contain a small amount of hydrochloric or other acid, whereby the wash is slightly acid at a pH of from 2.5 to 3.5. It has been found that this serves more effectively to remove protein and other impurities from the collected lactose crystals.

The process as described above produces lactose of a purity of the order of 99.1% or better. The lactose yield may be of the order of 35 to 55%. The mother liquor from step 13, with or without being blended with wash water from step 14, may be subjected to further treatment to increase the yield of lactose and to provide another lactose product of high purity. Thus the liquor from step 13 is shown being subjected to a further precipitating step 15 which in this instance is preferably carried out by adjusting the ph to a value of the order of 7 to 10, by adding an alkali neutralizing agent such as sodium or potassium hydroxide. Following or at the time the neutralizing agent is added, the material is heated to a temperature of the order of 140° to 150° F., whereby a substantial percentage of the mineral salts present, which are not precipitated and removed in steps 11 and 12, are precipitated. The solids concentration at the time of this treatment may be of the order of 20 to 30%. The salts precipitated in this manner are mainly citrate salts. The phosphate buffer salts are precipitated and also a substantial amount of non-protein nitrogen. Following step 15 the material is treated for the removal of the precipitate as by the step 16 carried out like clarification in step 12. Both clarification steps 12 and 16 may also be carried out by centrifuging to remove the precipitate followed by decolorizing by passing the material through a decolorizing carbon filter while at a temperature of about 180° to 200° F. Lactose is then removed by crystallizing and collecting in step 17, with or without further washing, to produce the lactose product B. Here again it may be necessary to further concentrate the material (e.g., 48 to 65% solids) following the filtering step 16 and before crystallizing in step 17, taking care to avoid concentrating to a solids level sufficient to cause further precipitation of residual mineral salts.

Assuming that the process includes the second stage of lactose crystallization and removal, the overall yield of lactose for the process may be of the order of 80% or higher. Also the product B may have a purity of 97% or higher.

In some instances it may be desirable to spray dry the filtered permeate from step 12. Thus, the permeate may be concentrated and spray dried in step 21 to produce the spray dried lactose product C. Because of the removal of whey protein and a substantial amount of buffer salts in the precipitating step 11, the flavor of the spray dried product is superior to that of untreated spray dried whey permeate, and therefore product C can be used in formulating various food and feed products.

The buffer salts removed in the filtering step 12 may be subjected to drying 22 to produce the dry product D. This is a high calcium mineral salt content product which has value as an additive to various formulations including animal feeds. An analysis of a typical product D is as follows:

| | |
|---|---|
| Water | 5.805% |
| Total Nitrogen | 0.23% |
| Ash | 31.09% |
| Calcium | 14.3% |
| Phosphorous | 0.43% |
| Magnesium | 0.07% |
| Sodium | 0.25% |
| Potassium | 0.8% |
| Citrate | 43.4% |
| Lactose | 25.5% |
| Titratable Acidity | 2.0% |
| pH | 5.3 |

As previously mentioned, the source material may be sweet whey such as is produced in the manufacture of Cheddar or mozzarella cheese. The normal pH range of such whey is about 5.8 to 6.5. The composition is similar but not precisely the same as acid whey. The mineral salt content includes substantially the same calcium and citrate buffering compounds and the buffer phosphates contained in acid whey, with minor differences in amounts. After pretreatment such as pasteurization or chemical treatment to control contamination, the whey is subjected to membrane ultrafiltration the same as described for acid whey, thereby producing a protein-rich fraction and a whey permeate. Ultrafiltration is carried out whereby the residual protein in the permeate does not amount to more than about 6.0% of the total solids content. The precipitating step 11 is carried out as described for acid whey. More particularly, the permeate, which may have a total solids content of about 5 to 7.5%, is heated to a temperature level of about 180° to 200° F., concentrated by evaporation to a solids content of about 40 to 45%, and held at that temperature to promote precipitation. As with acid whey, the sequence of these steps can be altered by first concentrating the permeate by vacuum evaporation and then heating and holding for promoting precipitation. The holding period for precipitation at the above temperature level and concentration may be for a period of 30 to 90 minutes. The calcium and citrate salts of the buffering system are thereby precipitated, while the phosphate salts of the buffering system remain in solution. Likewise as with acid whey, this treatment does not precipitate the simpler monovalent salts such as sodium chloride. The treatment serves to precipitate from about 5 to 15% of the total mineral salts of the permeate. The precipitate is removed as by filtration in step 12 and the remaining permeate is clarified and treated for the removal of lactose. Filtration in step 12 can be carried out while the permeate is at a temperature level of 180° to 200° F. and the filter medium may be the same as described for acid whey. Preparatory to crystallizing in step 12, the material is further concentrated as by vacuum evaporation to about 50 to 60% total solids. Likewise, as with acid whey, concentrating to levels which cause further precipitation of mineral salts should be avoided at this point. It is desirable to effect further concentration of the permeate following removal of calcium and citrate salts without further precipitation of solids, in order to provide an effective yield of lactose for the crystallizing operation. Lactose crystals from washing step 14 may be subjected to drying by conventional methods to produce the lactose product A. As with acid whey, acidified water can be used for washing the lactose crystals in step 14.

Using sweet Cheddar cheese whey as the source material, the purity of the lactose produced (product A) may be of the order of 99.1% or better, and the lactose yield (product A) may be of the order of from 35 to 55%. Additional processing steps can be applied as shown in FIG. 1 and as described for acid whey to produce the products B, C and D.

The process of FIG. 2 employs a precipitating step together with lactose refining. Thus in this instance whey is subjected to membrane ultrafiltration 51 to remove whey protein, and the resulting permeate is subjected to the precipitating step 52 which is carried out by heating and concentrating in the manner described in connection with step 11 of FIG. 1. After step 52 the material is subjected to step 53 which can be carried out by filtering and clarifying the material while it is at an elevated temperature of the order of 180° to 200° F. to remove precipitate and to clarify the permeate. The clarified permeate is then further concentrated in step 54 to a solids content of the order of 50 to 60% and subjected to the lactose crystallizing step 55. The lactose crystals collected in step 56 are subjected to washing, which can be carried out by acidified wash water at a pH of from 2.5 to 3.5. The lactose from step 56 may be dried in step 57 to produce the dry lactose product I. The mother liquor from step 56 is shown being subjected to pH adjustment and precipitating in step 58 which can be carried out in the same manner as step 15 of FIG. 1. After filtering and clarifying in step 59 the material may be concentrated at 60 (e.g, to 50 to 60% solids), subjected to crystallizing 61, and the crystals collected and washed in step 62, preferably with acidified wash water. Drying 63 provides the lactose product J. Precipitate from step 53 may be dried at 64 to provide the mineral salt product K. Likewise precipitate from step 59 can be dried at 66 to produce the mineral salt product L. Concentrated mother liquor from step 60 may be directly dried at 67 to produce the lactose product M.

The process described in connection with FIG. 2 produces lactose products of high purity, and in addition, lactose yields can be obtained of the order of 70% or higher. Lactose products I and J may have purities of about 99% and 97% respectively.

For a product of lesser purity (e.g., 90%), concentrate from 54 can be spray dried at 68 to produce the lactose product N.

In the embodiments of the invention described above, removal of whey protein and precipitation and removal of precipitated salts is carried out before removal of lactose by further concentration and crystallization. To effect crystallization of a substantial amount of the lactose present (e.g., 40 to 60%) the permeate should be concentrated by evaporation to solids contents of 50 to 65%. Since evaporation to such concentrations requires some heat treatment, some of the mineral salts, if not previously removed, precipitate and are removed with the collected lactose crystals, thus reducing the purity of the lactose product. By previous removal of a substantial amount of the mineral salts (e.g., 10% or more) such contamination of the recovered lactose is avoided. In addition, when precipitation of mineral salts is carried out in the manners and under the conditions described, lactose remains in solution and therefore no appreciable amount of lactose is removed with the precipitated salts.

The process shown in FIG. 3 employs both precipitation of mineral salts and electrodialysis. The permeate from ultrafiltration step 71 is subjected to precipitation step 72 carried out by heating and concentration as for step 11 of FIG. 1. This serves to precipitate particularly the calcium and citrate salts of the buffering system. The partially demineralized permeate is then treated in step 73 for removal of the precipitate and clarification, as described for step 12 of FIG. 1. Further mineral salts are removed to the extent desired in the electrodialyzing step 74. Before electrodialyzing, the pH and concentration may be adjusted for optimum operation (e.g., to pH 3.9 to 4.2 and 30% solids). Thereafter the material may be further concentrated at 75 and spray dried at 76 to produce the dry lactose product O. A purer lactose product can be obtained by concentrating 77, crystallizing and collecting lactose crystals 78, washing of the crystals 79 and drying 80 to produce the lactose product P. It should be noted that electrodialysis operates more effectively on monovalent salts, which are not removed by the precipitating and removal steps 72 and 73.

All of the above procedures first remove the whey protein and then a substantial portion of the mineral salt content, leaving a material consisting mainly of lactose. This is exemplified in its simplest form by steps 10, 11 and 12 of FIG. 1, which remove whey protein and reduce the ash content, leaving a material comprising mainly lactose which can be further processed as shown in FIGS. 1 and 2.

Examples of the process are as follows:

EXAMPLE 1

The procedure was generally as shown in FIG. 1. The source whey was an acid whey produced by the manufacture of cottage cheese. The whey was subjected to membrane ultrafiltration, making use of equipment manufactured by Westinghouse Company. The resulting permeate had a total solids content of 6.6% and analyzed as follows (dry solids basis)

| | |
|---|---|
| Protein | 6.3% |
| Ash | 11.1% |
| Titratable Acidity | 10.0% |

| | |
|---|---|
| -continued | |
| Lactose | 70.00% |

With respect to the ash content, 13.34% of the ash comprised calcium. The permeate was first passed through a filter of activated carbon while at a temperature of 120° to 130° F., to decolorize the material and to remove a part of the protein. Thereafter the permeate was heated to 180° to 200° F., and concentrated to 40% solids. This treatment caused a floc to be precipitated. The material was then filtered making use of acid-washed diatomaceous earth filter medium (Celite). At the time of filtering the material was at a temperature of 180° F., which served to maintain the lactose in solution. The filtrate was then further concentrated to 48% solids, and cooled to effect crystallization of lactose. The resulting crystals were collected and subjected to washing in a basket centrifuge. The resulting lactose crystals were dried to produce the lactose product A of FIG. 1.

The filtrate from step 12 of FIG. 1 had a total solids content of 46.46% which analyzed as follows:

| | |
|---|---|
| Nitrogen | 0.37% |
| Ash | 5.15% |
| Lactose | 33.95% |
| Titratable acidity | 0.35% |

The reduced acidity was due to the removal of buffer salts.

The purity of the lactose crystals collected in step 13, without washing, was 98.3%. After washing with acidified water, the purity was 99.3%.

Some of the filtrate from step 12 was subjected to spray drying to produce a product C. Also it was confirmed that the precipitate from step 12 could be dried to produce a mineral salt product D suitable for use as an animal feed supplement. Mother liquor from the crystallizing step 13 of FIG. 1 and wash effluent from the washing step 14 were merged, concentrated to 20.5% solids, and sodium hydroxide added to adjust the pH to the level of 9. This resulted in some further precipitation after which the material was filtered in step 16, the filtrate acidified to pH 4.5 and after further concentration to 69% solids, was cooled to produce crystallization of lactose in step 17. The collected lactose crystals were washed to produce product B, which was lactose having a purity of 89%.

It was confirmed by analysis that the treatment in step 11 served to precipitate the calcium and citrate buffer salts and that the product D was a mineral product comprising mainly the calcium and citrate buffering compounds. Also it was confirmed that additional mineral salts were removed in step 15, including the buffer phosphates.

EXAMPLE 2

The procedure was generally that of FIG. 2. Acid whey was subjected to membrane ultrafiltration to produce a permeate analyzing generally the same as in Example 2. The permeate was then treated to heating and concentrating for precipitating buffer salts (calcium and citrate), followed by clarifying in step 53, substantially as explained in Example 1. Following this treatment the permeate, after concentrating to 50% solids, was subjected to crystallizing 55, collection and washing of the crystals in step 56 and drying 57 to provide a lactose product corresponding generally to product A of FIG. 1 and Example 1. To attain a product of higher purity and to increase the yield of lactose, the mother liquor from 56 may be subjected to the further steps 58, 59, 60, 61 and 62, and the collected crystals dried to provide product J. Washing in step 62 may employ acidulated water (pH 2.5). Product J produced in this manner may be a lactose having an estimated purity of 97%.

Some of the clarified concentrated filtrate from step 59 may be spray dried as indicated by step 67 of FIG. 3 to produce the spray dried product K, which may contain 90% lactose.

EXAMPLE 3

Sweet Cheddar cheese whey was used as the source material. After pasteurization to control bacterial contamination, the whey was processed substantially as described for acid whey. The permeate produced by ultrafiltration had a total solids content of 6.02%, and analyzed as follows (dry solids basis):

| | |
|---|---|
| Protein | 5.48% |
| Ash | 8.30% |
| Acidity | 2.15% |
| Lactose | 85.0% |
| Citrate | 2.71% |
| Calcium | 0.53% |

About 6.4% of the ash content comprised calcium. The permeate was filtered as described in Example 1 to decolorize the material and remove a part of the protein content. It was then heated and concentrated to effect precipitation of calcium and citrate salts and the precipitate was removed as in Example 1. The filtrate was further concentrated to about 48% solids and cooled to effect crystallization of lactose. The lactose crystals were removed and subjected to washing as in Example 1. The purity of the lactose crystals collected in step 13 without washing was about 98%, and after washing with fresh water, the purity was about 99.1%.

What is claimed is:

1. A process for the treatment of whey derived from the manufacture of cheese and having titratable acidity, the steps of subjecting the whey to membrane ultrafiltration to form a protein-rich fraction and a permeate fraction having a solids content of the order of 5.0 to 7.5% and having a lactose content of about 68 to 87%, a protein content of not more than about 6% and a mineral salt content, the mineral salt content including calcium and citrate salts together with phosphate and monovalent salts, precipitating calcium and citrate salts of the permeate without substantial precipitation of phosphate salts by concentrating the unneutralized permeate to a solids content of about 40 to 45%, and by holding the concentrate at a temperature level of about 180° to 200° F. for about 30 to 90 minutes to effect precipitation of calcium and citrate salts without substantial precipitation of phosphate salts, the precipitated salts being about 5.0 to 15.0% of the total mineral salts, removing the precpitated solids from the permeate, and then further concentrating the permeate and crystallizing and removing lactose from the same.

2. A process as in claim 1 in which the removed lactose is subjected to washing with acidulated water.

3. A process as in claim 2 in which the permeate after crystallization and removal of lactose is combined with wash effluent and is subjected to a second precipitating operation to precipitate a substantial amount of mineral salts, removing the mineral salts so precipitated, and then crystallizing and removing lactose from the liquor.

4. A process as in claim 3 in which the second precipitating operation is carried out by adjusting the pH to 7–10 by addition of a neutralizing agent and by holding at a temperature of about 140° to 150° F. for a time sufficient to effect precipitation of a substantial amount of mineral salts.

5. A process as in claim 1 in which some of the mineral salts of the whey are removed by electrodialysis before removal of crystallized lactose.

6. A process as in claim 5 in which some of the mineral salts of the permeate are removed by electrodialysis after removal of the precipitated solids and before said further concentrating of the permeate.

* * * * *